US012511610B1

(12) United States Patent
Nagar et al.

(10) Patent No.: US 12,511,610 B1
(45) Date of Patent: Dec. 30, 2025

(54) SYSTEM AND METHOD OF WISH-LIST ITEM PICKUP THROUGH CUSTOMER CONNECTION

(71) Applicant: Blue Yonder Group, Inc., Scottsdale, AZ (US)

(72) Inventors: Raghuveer Prasad Nagar, Kota (IN); Peter Edward Stubbs, Georgetown, MA (US); Sumit Pandey, Acton, MA (US)

(73) Assignee: Blue Yonder Group, Inc., Scottsdale, AZ (US)

(*) Notice: Subject to any disclaimer, the term of this patent is extended or adjusted under 35 U.S.C. 154(b) by 101 days.

(21) Appl. No.: 18/581,054

(22) Filed: Feb. 19, 2024

Related U.S. Application Data

(60) Provisional application No. 63/470,666, filed on Jun. 2, 2023, provisional application No. 63/467,841, filed on May 19, 2023, provisional application No. 63/464,433, filed on May 5, 2023.

(51) Int. Cl.
*G06Q 30/00* (2023.01)
*G06Q 10/0836* (2023.01)
*G06Q 10/087* (2023.01)
*G06Q 30/0601* (2023.01)

(52) U.S. Cl.
CPC ....... *G06Q 10/0836* (2013.01); *G06Q 10/087* (2013.01); *G06Q 30/0635* (2013.01)

(58) Field of Classification Search
CPC ................................................ G06Q 30/06–08
See application file for complete search history.

(56) References Cited

U.S. PATENT DOCUMENTS

| | | | |
|---|---|---|---|
| 9,477,977 B2 | 10/2016 | Dessert et al. | |
| 10,296,962 B2 | 5/2019 | Abraham et al. | |
| 10,430,864 B2 | 10/2019 | Bekbolatov et al. | |
| 11,037,184 B2* | 6/2021 | Li | G06Q 30/0239 |

(Continued)

FOREIGN PATENT DOCUMENTS

AU    2012200918 B2    8/2013

OTHER PUBLICATIONS

Anonymous, "Recommend eCommerce Product Pickup Location Based on Pre-Shopping and Post-Shopping Activity", IP.com Prior Art Database Technical Disclosure, No. IPCOM000270536D, Jul. 13, 2022 (Year: 2022).*

*Primary Examiner* — Ethan D Civan
(74) *Attorney, Agent, or Firm* — Spencer Fane LLP; Steven J. Laureanti

(57) ABSTRACT

A system and method are disclosed for using a visitor to pick up orders for a connection at an order fulfillment site. The method includes detecting a visitor at an order fulfillment site, determining a connection of the visitor, where the connection has a wish-list of items associated with the order fulfillment site, determining an availability of items from the wish-list of the connection, deriving visitor constraints of the visitor that may impact an ability of the visitor to pick up the available items, prompting the connection for acceptance to place an order for at least one of the items using the visitor as a pickup resource, where the item conforms to the visitor constraints, generating and initiating a pick-pack-ship process for the order, and executing order fulfillment processes to enable the order fulfillment site to hand over the order to the visitor.

17 Claims, 3 Drawing Sheets

(56) References Cited

U.S. PATENT DOCUMENTS

| | | |
|---|---|---|
| 2011/0208613 A1 | 8/2011 | Parham |
| 2017/0337607 A1* | 11/2017 | Li ........................ G06Q 30/0613 |
| 2018/0012179 A1* | 1/2018 | Wilkinson ......... G06Q 30/0631 |
| 2018/0046982 A1* | 2/2018 | Li ........................ G06Q 30/0639 |
| 2018/0285911 A1* | 10/2018 | Li ........................ G06Q 30/0635 |
| 2019/0095736 A1* | 3/2019 | Stahlfeld ................. G06F 3/011 |
| 2021/0056615 A1* | 2/2021 | Vedula ............... G06Q 10/0836 |
| 2022/0036295 A1 | 2/2022 | Lert, Jr. |

* cited by examiner

SYSTEM AND METHOD OF WISH-LIST ITEM PICKUP THROUGH CUSTOMER CONNECTION

CROSS-REFERENCE TO RELATED APPLICATIONS

The present disclosure is related to that disclosed in U.S. Provisional Application No. 63/470,666, filed Jun. 2, 2023, entitled "System for Wish-list Item Pickup through Customer Connection," U.S. Provisional Application No. 63/467,841, filed May 19, 2023, entitled "On-Demand Capacity Through Dynamic Contracts," and U.S. Provisional Application No. 63/464,433, filed May 5, 2023, entitled "System to Utilize Retail Visitors to Fulfill Store Tasks and Improve Customer Satisfaction." U.S. Provisional Application Nos. 63/470,666, 63/467,841, and 63/464,433 are assigned to the assignee of the present application. The present invention hereby claims priority under 35 U.S.C. § 119(e) to U.S. Provisional Application Nos. 63/470,666, 63/467,841, and 63/464,433.

TECHNICAL FIELD

The present disclosure relates generally to supply chain logistics and more specifically to fulfilling order fulfillment tasks in a supply chain.

BACKGROUND

Order fulfillment is a key process in retail stores, warehouses, distribution centers, and other order fulfillment sites and is typically organized and managed by a fulfillment system. An order fulfillment process may include various tasks, such as picking, packing, and delivering, which are performed by human or machine resources that have associated resource capacity. Resource capacity determines the number of orders that an order fulfillment site may fulfill at a given time or time period. However, existing fulfillment systems are limited to dedicated resources that are present at the order fulfillment site at a given time or during a time period and do not account for dynamic changes in order demand and configured resource capacity. For example, order demand from order creation and modification may increase unexpectedly, or a resource that has a picker role may not show up for scheduled work. Such dynamic changes in orders and configured resource capacity may cause order demand to exceed configured resource capacity of an order fulfillment site, in which case new orders or order modifications over capacity are not promised for that day. Use of existing fulfillment systems thus results in lost sales, which reduces revenue and decreases customer satisfaction, both of which are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
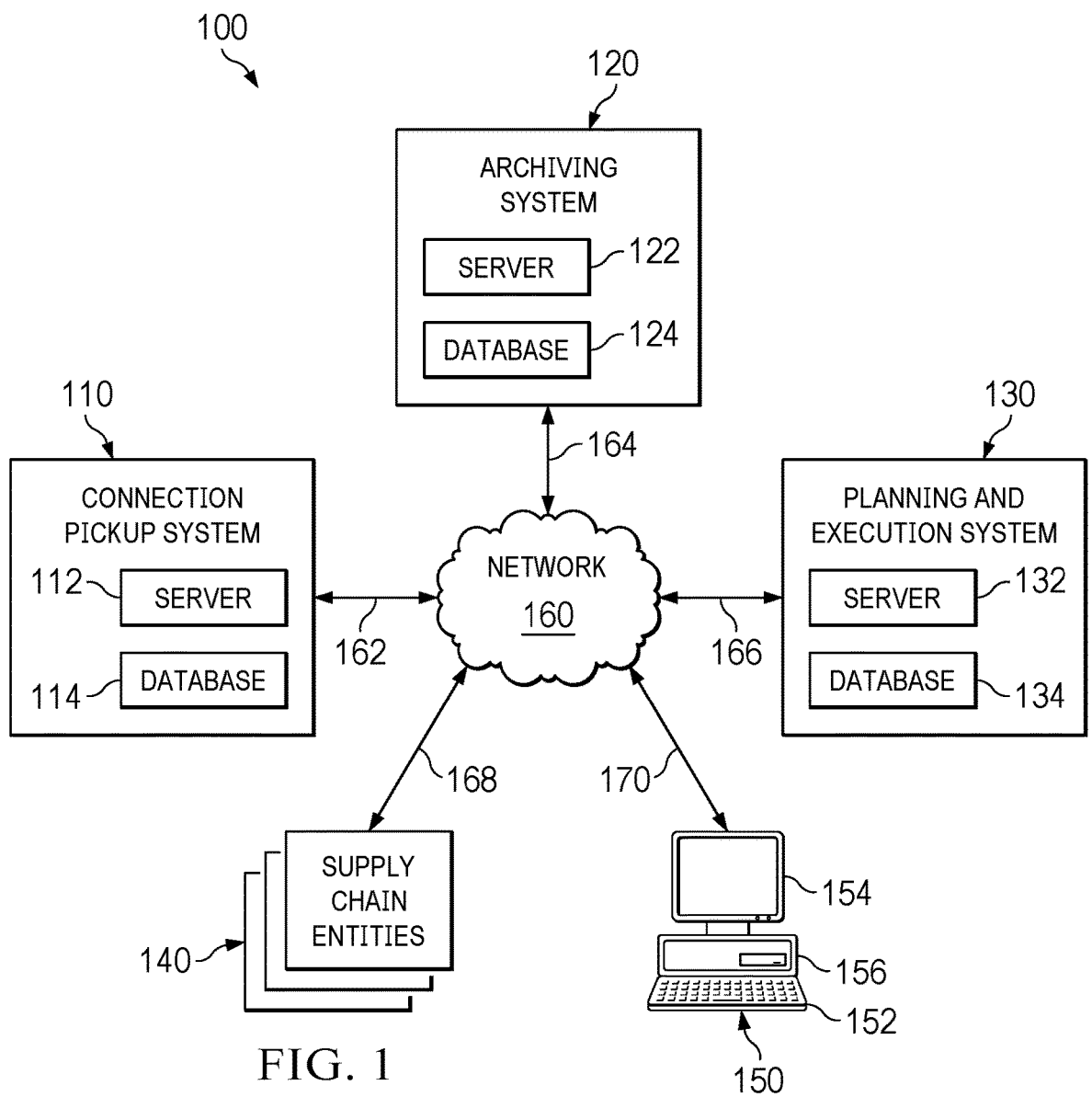
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide systems and methods for determining whether a visitor to an order fulfillment site, such as a retail store, may pick up an order from the retail store for a connection of the visitor. Embodiments automatically initiate picking, packing, and/or shipping processes to enable the visitor to pick up the one or more items. Embodiments detect the presence of the visitor in an order fulfillment site using facial recognition or other data associated with the visitor. Embodiments further determine whether possible items to be picked up conform to constraints of the visitor, such as transportation or timing constraints.

Embodiments of the following disclosure enable order fulfillment sites to fulfill orders without expending configured resource capacity. Use of embodiments enable retailers to complete sales that may otherwise not occur unless or until a connection of the visitor visits the retailer. Use of embodiments may further lessen the required resource usage to perform order fulfillment at an order fulfillment site, thus increasing overall order fulfillment efficiency at the order fulfillment site or within a supply chain network. Embodiments determine possible connections of the visitor based, at least in part, on various sources of personal data of the visitor and of the possible connections. Implementation of the systems and methods described herein may include the pre-registration of customers to data collection and processing services to protect customer data privacy.

FIG. 1 illustrates supply chain network 100, in accordance with a first embodiment. Supply chain network 100 comprises connection pickup system 110, archiving system 120, planning and execution system 130, one or more supply chain entities 140, one or more computers 150, network 160, and one or more communication links 162-170. Although a single connection pickup system 110, a single archiving system 120, a single planning and execution system 130, one or more supply chain entities 140, one or more computers 150, a single network 160, and one or more communication links 162-170 are shown and described, embodiments contemplate any number of connection pickup systems, archiving systems, planning and execution systems, supply chain entities, computers, networks, or communication links, according to particular needs.

In one embodiment, connection pickup system 110 comprises server 112 and database 114. As described in further detail below, connection pickup system 110 may detect that a visitor has entered an order fulfillment site, such as a retail store, and determine a connection of the visitor who has a "wish-list", or other listing of desired items, associated with the retail store. Although embodiments described below use retail stores as an example of where connection pickup system 110 may be implemented, embodiments may be used at any order fulfillment site. As used herein, an order fulfillment site may be any location within supply chain network 100 where inventory is stored or managed and orders are fulfilled, such as a retail store, a distribution center, a warehouse, or any other suitable location at one or more supply chain entities 140 within supply chain network 100.

In embodiments, connection pickup system 110 determines the availability of one or more items from the wishlist at the retail store and derives whether the visitor has any constraints on performing pickup for the one or more items. In some embodiments, when connection pickup system 110 determines that the visitor is able to pick up the one or more items, connection pickup system 110 prompts the connection to agree to place an order for the one or more items to be picked up by the visitor and prompts the visitor to agree to pick up the order for the connection. In other embodiments, connection pickup system 110 prompts the visitor to purchase and pick up one or more items for the connection without prompting the connection, such as, for example, when the one or more items are a gift for the connection. On acceptance, connection pickup system 110 may generate a new order or an order modification comprising the one or more items and initiate a process for handing over the order to the visitor. Connection pickup system 110 may also initiate any required backroom processes for handing over the order to the visitor. According to embodiments, connection pickup system 110 instructs one or more pieces of automated machinery to hand over the order to the visitor. In addition, or as an alternative, connection pickup system 110 may transmit instructions to one or more employees of the retail store to hand over the order to the visitor.

Archiving system 120 comprises server 122 and database 124. Although archiving system 120 is shown as comprising a single server 122 and a single database 124, embodiments contemplate any suitable number of servers or databases internal to, or externally coupled with, archiving system 120. Server 122 of archiving system 120 may support one or more processes for receiving and storing data from planning and execution system 130 and/or one or more computers 150 of supply chain network 100. According to some embodiments, archiving system 120 comprises an archive of data received from planning and execution system 130 and/or one or more computers 150 of supply chain network 100. Archiving system 120 provides archived data to connection pickup system 110 and/or planning and execution system 130. Server 122 may store the received data in database 124. Database 124 of archiving system 120 may comprise one or more databases or other data storage arrangements at one or more locations local to, or remote from, server 122.

According to an embodiment, planning and execution system 130 comprises server 132 and database 134. Supply chain planning and execution is typically performed by several distinct and dissimilar processes, including, for example, strategic assortment planning, demand planning, operations planning, production planning, supply planning, distribution planning, execution, pricing, forecasting, transportation management, warehouse management, inventory management, fulfillment, procurement, and the like. Server 132 of planning and execution system 130 comprises one or more modules, such as, for example, a sourcing module, a scheduling module, and/or a pick-pack-ship module for performing one or more order fulfillment processes. Server 132 stores and retrieves data from database 134 or one or more locations in supply chain network 100. In addition, planning and execution system 130 operates on one or more computers 150 that are integral to, or separate from, the hardware and/or software that support archiving system 120 and connection pickup system 110.

One or more supply chain entities 140 may represent one or more suppliers, manufacturers, distribution centers, and retailers in one or more supply chain networks, including one or more enterprises. One or more suppliers may be any suitable entity that offers to sell or otherwise provides one or more items or components to one or more manufacturers or buyers. One or more suppliers may, for example, receive an item from a first supply chain entity of one or more supply chain entities 140 in supply chain network 100 and provide the item to another supply chain entity of one or more supply chain entities 140, which in some embodiments may be a buyer, a customer, or an end user. Items may comprise, for example, components, materials, products, parts, supplies, or other items that may be used to produce products. In addition, or as an alternative, an item may comprise a supply or resource that is used to manufacture the item but does not become a part of the item. In embodiments, items may comprise a service, such as an installation service. One or more suppliers may comprise automated distribution systems that automatically transport items to one or more manufacturers based, at least in part, on a supply chain plan having fair-shared items or resources, a material or capacity reallocation, current and projected inventory levels, and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good, or product. In one embodiment, a product represents an item ready to be supplied to, for example, another supply chain entity of one or more supply chain entities 140, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produces products based, at least in part, on a supply chain plan having fair-shared items or resources, a material or capacity reallocation, current and projected inventory levels, and/or one or more additional factors described herein.

One or more distribution centers may be any suitable entity that offers to sell or otherwise distributes at least one product to one or more retailers and/or customers. Distribution centers may, for example, receive a product from a first supply chain entity of one or more supply chain entities 140 in supply chain network 100 and store and transport the product for a second supply chain entity of one or more supply chain entities 140. Such distribution centers may comprise automated warehousing systems that automatically transport products to one or more retailers or customers and/or automatically remove an item from, or place an item into, inventory based, at least in part, on a supply chain plan having fair-shared items or resources, a material or capacity reallocation, current and projected inventory levels, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location.

The same supply chain entity may simultaneously act as any one or more suppliers, manufacturers, distribution centers, and retailers. For example, one or more supply chain entities 140 acting as a manufacturer may produce a product, and the same entity may act as a supplier to supply a product to another supply chain entity of one or more supply chain entities 140. Although one example of supply chain network 100 is shown and described, embodiments contemplate any configuration of supply chain network 100 without departing from the scope of the present disclosure.

As shown in FIG. 1, supply chain network 100 comprising connection pickup system 110, archiving system 120, planning and execution system 130, and one or more supply chain entities 140 may operate on one or more computers 150 that are integral to, or separate from, the hardware and/or software that support connection pickup system 110, archiving system 120, planning and execution system 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, a CD-ROM, an in-memory device, or any other suitable media to receive output from and provide input to supply chain network 100.

One or more computers 150 may include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the methods. An apparatus implementing special purpose logic circuitry, for example, one or more field-programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations local to, or remote from, connection pickup system 110, archiving system 120, planning and execution system 130, and one or more supply chain entities 140. In addition, each of one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with connection pickup system 110 and archiving system 120.

In one embodiment, connection pickup system 110 may be coupled with network 160 using communication link 162, which may be any wireline, wireless, or other link suitable to support data communications between connection pickup system 110 and network 160 during operation of supply chain network 100. Archiving system 120 may be coupled with network 160 using communication link 164, which may be any wireline, wireless, or other link suitable to support data communications between archiving system 120 and network 160 during operation of supply chain network 100. Planning and execution system 130 may be coupled with network 160 using communication link 166, which may be any wireline, wireless, or other link suitable to support data communications between planning and execution system 130 and network 160 during operation of supply chain network 100. One or more supply chain entities 140 may be coupled with network 160 using communication link 168, which may be any wireline, wireless, or other link suitable to support data communications between one or more supply chain entities 140 and network 160 during operation of supply chain network 100. One or more computers 150 may be coupled with network 160 using communication link 170, which may be any wireline, wireless, or other link suitable to support data communications between one or more computers 150 and network 160 during operation of supply chain network 100. Although communication links 162-170 are shown as generally coupling connection pickup system 110, archiving system 120, planning and execution system 130, one or more supply chain entities 140, and one or more computers 150 to network 160, any of connection pickup system 110, archiving system 120, planning and execution system 130, one or more supply chain entities 140, and one or more computers 150 may communicate directly with each other, according to particular needs.

In another embodiment, network 160 includes the Internet and any appropriate local area networks (LANs), metropolitan area networks (MANs), or wide area networks (WANs) coupling connection pickup system 110, archiving system 120, planning and execution system 130, one or more supply chain entities 140, and one or more computers 150. For example, data may be maintained locally to, or externally of, connection pickup system 110, archiving system 120, planning and execution system 130, one or more supply chain entities 140, and one or more computers 150 and made available to one or more associated users of connection pickup system 110, archiving system 120, planning and execution system 130, one or more supply chain entities 140, and one or more computers 150 using network 160 or in any other appropriate manner. For example, data may be maintained in a cloud database at one or more locations external to connection pickup system 110, archiving system 120, planning and execution system 130, one or more supply chain entities 140, and one or more computers 150 and made available to one or more associated users of connection pickup system 110, archiving system 120, planning and execution system 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Figure 2:
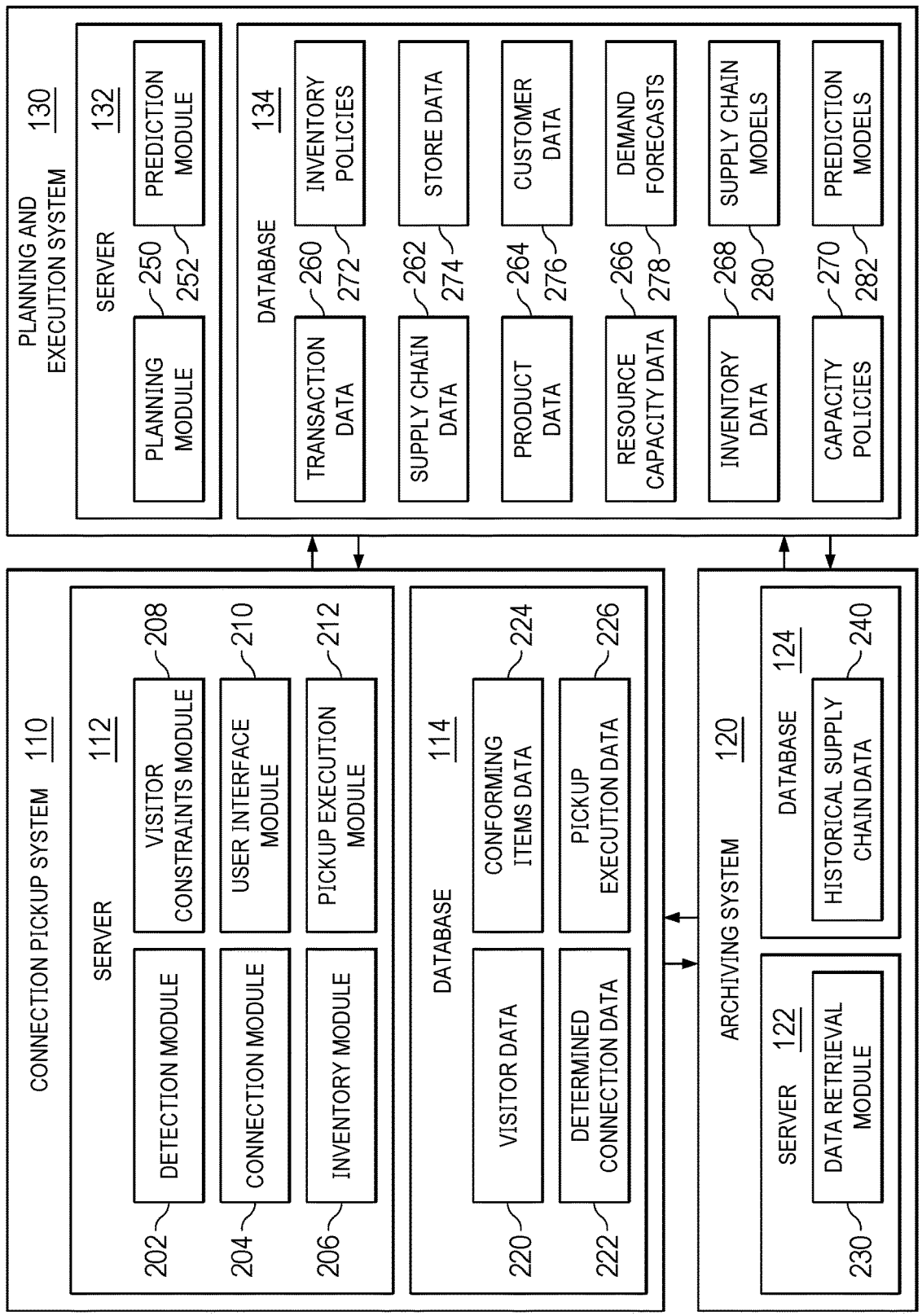
FIG. 2 illustrates the connection pickup system, the archiving system, and the planning and execution system of FIG. 1 in greater detail, in accordance with an embodiment.

FIG. 2 illustrates connection pickup system 110, archiving system 120, and planning and execution system 130 of FIG. 1 in greater detail, in accordance with an embodiment. Connection pickup system 110 may comprise server 112 and database 114, as described above. Although connection pickup system 110 is shown as comprising a single server 112 and a single database 114, embodiments contemplate any suitable number of servers or databases internal to, or externally coupled with, connection pickup system 110.

Server 112 of connection pickup system 110 comprises detection module 202, connection module 204, inventory module 206, visitor constraints module 208, user interface module 210, and pickup execution module 212. Although server 112 is shown and described as comprising a single detection module 202, a single connection module 204, a single inventory module 206, a single visitor constraints module 208, a single user interface module 210, and a single pickup execution module 212, embodiments contemplate any suitable number or combination of these located at one or more locations local to, or remote from, connection pickup system 110, such as on multiple servers or computers 150 at one or more locations in supply chain network 100.

In an embodiment, detection module 202 detects that a visitor has entered an order fulfillment site within supply chain network 100. For example, detection module 202 may use one or more machine learning (ML) or artificial intelligence (AI) techniques to perform facial recognition of the visitor based on video feeds of cameras within the order fulfillment site to detect that the visitor has entered the order fulfillment site. As a further example, detection module 202 may analyze location data of the visitor, such as via a cell phone of the visitor or any other IoT-enabled device of the visitor, to detect that the visitor has entered the order fulfillment site. Detection module 202 may also detect that the visitor has entered an order fulfillment site based on manual input from the visitor or from a worker, contractor, or other employee associated with the order fulfillment site. In addition, or as an alternative, detection module 202 may predict that the visitor will enter the order the fulfillment site in the future using various appointment or calendar data associated with the visitor, such as an appointment to visit a retail store to try an item or pick up an item ordered online. Detection module 202 may update visitor data 220 of database 114 upon detecting that the visitor has entered the order fulfillment site or upon predicting that the visitor will enter the order fulfillment site.

Connection module 204 determines a connection of the visitor who detection module 202 detects at the order fulfillment site, or who detection module 202 predicts will enter the order fulfillment site. As used herein, the term "connection" means an individual with an existing relationship with a visitor, such as a family member of a visitor, a friend of a visitor, a co-worker of a visitor, or any other person with an association with a visitor. Connection module 204 may determine the connection based on various data of the visitor, such as message data, social media data, profile data, or any other data associated with the visitor, as discussed in further detail below. In embodiments, connection pickup system 110 considers various possible types of relationships with the visitor to determine the connection of the visitor. For example, the visitor may manually define connections, such as family members or friends, or connection module 204 may determine any connection that may be derived from visitor data 220, such as friends or connections as defined by social media accounts of the visitor.

In embodiments, connection module 204 determines a connection of the visitor who has an active "wish-list", or other set of desired items, associated with the order fulfillment site. For example, when connection module 204 identifies two possible connections of a visitor to a retail store, and only one of the possible connections has an identifiable account with a wish-list at the retail store, connection module 204 determines the possible connection with the wish-list to be a connection of the visitor for the purposes of connection pickup system 110. Connection module 204 may store the data of determined connection as determined connection data 222 of database 114.

Inventory module 206 determines the availability of one or more items of the wish-list associated with the connection. In embodiments, inventory module 206 accesses inventory data 268 of database 134 to determine the current availability of one or more items at a particular order fulfillment site. In embodiments where detection module 202 predicts that the visitor will enter the order fulfillment site in the future, when an item on the wish-list associated with the connection of the visitor is not currently available, inventory module 206 may initiate a process to transfer stock of the unavailable item from a different location within supply chain network 100 so that the item is in stock at the order fulfillment site at the time the visitor is predicted to enter the order fulfillment site. Inventory module 206 may update inventory data 268 of database 134 to indicate that an item is available for pickup at the order fulfillment site or will be available for pickup at the time the visitor is predicted to enter the order fulfillment site.

Visitor constraints module 208 derives visitor constraints of the visitor and determines which available items of the order fulfillment site conform to the visitor constraints. Visitor constraints module 208 may derive visitor constraints based on various data of the visitor, such as, for example, IoT data of the visitor that indicates a type of vehicle available to the visitor for transporting available items, calendar data of the visitor that indicates an ability or inability to perform pickup at certain times, manual input of the visitor specifying when the visitor may perform pickup, profile data of the visitor specifying whether the visitor is available to perform pickup, or any other data associated with the visitor that may indicate the ability or willingness of the visitor to perform pickup. For example, some available items of a wish-list may be too large for the visitor to pick up based on the size or type of vehicle of the visitor. As another example, when a calendar appointment of the visitor indicates that the visitor cannot complete pickup and delivery to the connection within a certain time period, visitor constraints module 208 derives that the visitor cannot pickup available items requiring refrigeration unless the vehicle has a refrigeration or insulation device. Visitor constraints module 208 may store the data of any available items that conform to the visitor constraints as conforming items data 224 of database 114.

User interface module 210 may display one or more graphical user interfaces (GUIs) on an output device of connection pickup system 110 or user devices of visitors. The GUIs may be used to display information to a user of connection pickup system 110 as well as receive input from the user of connection pickup system 110. For example, the GUIs may be used by connection pickup system 110 to prompt the visitor for acceptance to pick up an order for a connection, or to display details of the pickup to the visitor. In embodiments, connection pickup system 110 also uses the GUIs to prompt the connection for acceptance to place an order with the visitor picking up the order. User interface module 210 may generate GUIs to be sent to or displayed on devices associated with the visitor or the connection, such as mobile devices, computers, cell phones, AR devices, or any other device that may be associated with the visitor or the connection. In an embodiment, user interface module 210 may involve speech-based interaction with the user. For example, user interface module 210 may deliver the recommended path through an audio system of a device associated with the visitor.

Pickup execution module 212 initiates and/or executes any order fulfillment processes necessary to enable the visitor to pick up the order for the connection from the order fulfillment site. For example, pickup execution module 212 may generate and execute an order fulfillment plan for an order to be picked from a backroom warehouse and placed in an order pickup location for the visitor to pick up. In embodiments, pickup execution module 212 generates a pickup plan to transfer inventory between supply chain locations when a conforming item of an order is not currently in stock at the order fulfillment site where the visitor is picking up the order. Pickup execution module 212 may also execute order fulfillment plans or order fulfillment processes automatically using one or more pieces of automated machinery at one or more supply chain entities 140, as described in greater detail above. Pickup execution module 212 may store data related to order fulfillment plans or order fulfillment processes as pickup execution data 226 of database 114.

Database 114 of connection pickup system 110 may comprise one or more databases or other data storage arrangements at one or more locations local to, or remote from, server 112. Database 114 of connection pickup system 110 comprises, for example, visitor data 220, determined connection data 222, conforming items data 224, and pickup execution data 226. Although database 114 of connection pickup system 110 is shown and described as comprising visitor data 220, determined connection data 222, conforming items data 224, and pickup execution data 226, embodiments contemplate any suitable number or combination of data located at one or more locations local to, or remote from, connection pickup system 110, according to particular needs.

In an embodiment, visitor data 220 comprises data of visitors, such as shoppers, recipients picking up an order at a retail store, or any other visitors to an order fulfillment site. As discussed in further detail below, visitor data 220 may include profile data (e.g., items in saved wish-lists and items in saved carts), calendar data (e.g., upcoming events or bookings), IoT data (e.g., a connection asking a digital assistant for the items with particular attributes), message data (e.g., a connection posting item requirements to customer-service and/or social-media), browsing history data, and the like. In embodiments, message data includes not only communications (such as, for example, direct messages) between a visitor and a connection or order fulfillment site, but also any form of messaging such as social media posts. According to an embodiment, connection pickup system 110 uses natural language processing (NLP) techniques, such as Naive Bayes, for extracting a meaning from messages. Visitor data 220 may also comprise contact details for the visitors, such as communication preferences, devices associated with the visitors, and one or more contact methods, such as phone numbers, email addresses, or the like. In embodiments, visitor data 220 also includes data related to detecting the presence of the visitor in the order fulfillment site, such as appointment data indicating that the visitor will visit the order fulfillment site, location data associated with a device of the visitor, facial recognition data from one or more facial recognition sensors or cameras, or manual input by a worker of the order fulfillment site or by the visitor indicating a presence of the visitor at the order fulfillment site. According to embodiments, visitor data 220 also comprises profile information, including demographic information and preferences.

Determined connection data 222 comprises data associated with the connection of the visitor determined by connection module 204. According to embodiments, determined connection data 222 includes profile data, calendar data, IoT data, message data, browsing history data, and/or the like of the connection. For example, determined connection data 222 may include any connection of a particular visitor that has a wish-list associated with the order fulfillment site that the visitor has entered or is predicted to enter. In embodiments, determined connection data 222 includes contact information or preferences of the connection, wish-lists of the connection, or any other data related to the connection, as described in greater detail above.

Conforming items data 224 comprises one or more items that visitor constraints module 208 has determined to conform to visitor constraints and are available at the order fulfillment site. Conforming items data 224 may conforming items that are available at the order fulfillment site or will be available at the order fulfillment site at the time of visitor arrival. Conforming items data 224 may be used by user interface module 210 to prompt the connection for acceptance to place an order or to prompt the visitor for acceptance to pick up the order, as described in greater detail above.

Pickup execution data 226 comprises data related to order fulfillment processes or order fulfillment plans generated, initiated, and executed by pickup execution module 212. In embodiments, pickup execution data 226 includes one or more tasks to be performed by automated machinery or workers of the order fulfillment site to enable the visitor to pick up the order for the connection, such as a task for moving one or more inventory items within the order fulfillment site or within supply chain network 100. For example, pickup execution data 226 may include a task to transfer inventory from a warehouse to a retail location and to pick one or more items from a backroom of the retail location to be placed in an order pickup area of the retail location.

As discussed above, archiving system 120 comprises server 122 and database 124. Although archiving system 120 is shown as comprising a single server 122 and a single database 124, embodiments contemplate any suitable number of servers or databases internal to, or externally coupled with, archiving system 120.

Server 122 of archiving system 120 comprises data retrieval module 230. Although server 122 is shown and described as comprising a single data retrieval module 230, embodiments contemplate any suitable number or combination of data retrieval modules located at one or more locations local to, or remote from, archiving system 120, such as on multiple servers or computers 150 at one or more locations in supply chain network 100.

Data retrieval module 230 of archiving system 120 receives historical supply chain data 240 from planning and execution system 130 and one or more supply chain entities 140 and stores received historical supply chain data 240 in database 124 of archiving system 120. According to one embodiment, data retrieval module 230 of archiving system 120 may prepare historical supply chain data 240 for use as the training data of connection pickup system 110 by checking historical supply chain data 240 for errors and transforming historical supply chain data 240 to normalize, aggregate, and/or rescale historical supply chain data 240 to allow direct comparison of data received from planning and execution system 130, one or more supply chain entities 140, and/or one or more other locations local to, or remote from, archiving system 120. According to embodiments, data retrieval module 230 may receive data from one or more sources external to supply chain network 100, such as, for example, weather data, special events data, social media data, calendar data, and the like, and may store the received data as historical supply chain data 240.

Database 124 of archiving system 120 may comprise one or more databases or other data storage arrangements at one or more locations local to, or remote from, server 122. Database 124 of archiving system 120 comprises, for example, historical supply chain data 240. Although database 124 of archiving system 120 is shown and described as comprising historical supply chain data 240, embodiments contemplate any suitable number or combination of data located at one or more locations local to, or remote from, archiving system 120, according to particular needs.

Historical supply chain data 240 comprises historical data received from connection pickup system 110, archiving system 120, planning and execution system 130, one or more supply chain entities 140, and/or one or more computers 150. Historical supply chain data 240 may comprise, for example, weather data, special events data, social media data, calendar data, and the like. In an embodiment, historical supply chain data 240 may comprise, for example, historic sales patterns, prices, promotions, weather conditions, and other factors influencing future demand of the number of one or more items sold in one or more stores over a time period, such as, for example, one or more days, weeks, months, or years, a day of the week, a day of the month, a day of the year, a week of the month, a week of the year, a month of the year, special events, paydays, and the like.

As discussed above, planning and execution system 130 comprises server 132 and database 134. Although planning and execution system 130 is shown as comprising a single server 132 and a single database 134, embodiments contemplate any suitable number of servers or databases internal to, or externally coupled with, planning and execution system 130.

Server 132 of planning and execution system 130 comprises planning module 250 and prediction module 252. Although server 132 is shown and described as comprising a single planning module 250 and a single prediction module 252, embodiments contemplate any suitable number or combination of planning modules and prediction modules located at one or more locations local to, or remote from, planning and execution system 130, such as on multiple servers or computers 150 at one or more locations in supply chain network 100.

Database 134 of planning and execution system 130 may comprise one or more databases or other data storage arrangements at one or more locations local to, or remote from, server 132. Database 134 of planning and execution system 130 comprises, for example, transaction data 260, supply chain data 262, product data 264, resource capacity data 266, inventory data 268, capacity policies 270, inventory policies 272, store data 274, customer data 276, demand forecasts 278, supply chain models 280, and prediction models 282. Although database 134 of planning and execution system 130 is shown and described as comprising transaction data 260, supply chain data 262, product data 264, resource capacity data 266, inventory data 268, capacity policies 270, inventory policies 272, store data 274, customer data 276, demand forecasts 278, supply chain models 280, and prediction models 282, embodiments contemplate any suitable number or combination of data located at one or more locations local to, or remote from, planning and execution system 130, according to particular needs.

Planning module 250 of planning and execution system 130 works in connection with prediction module 252 to generate a plan based on one or more predicted retail volumes, classifications, or other predictions. By way of example and not of limitation, planning module 250 may comprise a demand planner that generates a demand forecast for one or more supply chain entities 140. Planning module 250 may generate the demand forecast, at least in part, from predictions and calculated factor values for one or more causal factors received from prediction module 252. By way of a further example, planning module 250 may comprise an assortment planner and/or a segmentation planner that generates product assortments that match causal effects calculated for one or more customers or products by prediction module 252, which may provide for increased customer satisfaction and sales, as well as reduced costs for shipping and stocking products at stores where the products are unlikely to sell.

Prediction module 252 of planning and execution system 130 applies samples of transaction data 260, supply chain data 262, product data 264, inventory data 268, store data 274, customer data 276, demand forecasts 278, and other data to prediction models 282 to generate predictions and calculated factor values for one or more causal factors. Prediction module 252 of planning and execution system 130 may predict a volume Y (target) from a set of causal factors X along with causal factors strengths that describe the strength of each causal factor variable contributing to the predicted volume. According to some embodiments, prediction module 252 generates predictions at daily intervals. However, embodiments contemplate longer and shorter prediction phases that may be performed, such as, for example, weekly, twice a week, twice a day, hourly, or the like.

Transaction data 260 of database 134 may comprise recorded sales and returns transactions and related data, including, for example, a transaction identification, time and date stamp, channel identification (such as stores or online touchpoints), product identification, actual cost, selling price, sales volume, customer identification, promotions, and/or the like. In addition, transaction data 260 is represented by any suitable combination of values and dimensions, aggregated or disaggregated, such as, for example, sales per week, sales per week per location, sales per day, sales per day per season, or the like.

Supply chain data 262 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals, and objectives of one or more supply chain entities 140.

Product data 264 of database 134 may comprise products identified by, for example, a product identifier (such as a Stock Keeping Unit (SKU), Universal Product Code (UPC), or the like), and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Resource capacity data 266 of database 134 may comprise any data relating to current or projected resource capacity values or states, order rules, or the like. For example, resource capacity data 266 may comprise the current level of capacity for each task at one or more locations across supply chain network 100. In addition, resource capacity data 266 may comprise order rules that describe one or more rules or limits on setting a capacity policy, including, but not limited to, a minimum order capacity, a maximum order capacity, a discount, a step-size order capacity, and batch quantity rules. According to some embodiments, planning and execution system 130 accesses and stores resource capacity data 266 in database 134, which may be used by planning and execution system 130 or connection pickup system 110 to place orders, set capacity levels at one or more locations in supply chain network 100, initiate manufacturing of one or more components, or the like in response to, and based at least in part on, a demand of planning and execution system 130.

Inventory data 268 of database 134 may comprise any data relating to current or projected inventory quantities or states, order rules, or the like. For example, inventory data 268 may comprise the current level of inventory for each item at one or more stocking points across supply chain network 100. In addition, inventory data 268 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 268 in database 134, which may be used by planning and execution system 130 or connection pickup system 110 to place orders, set inventory levels at one or more stocking points, initiate manufacturing of one or more components, or the like in response to, and based at least in part on, a forecasted demand of planning and execution system 130.

Capacity policies 270 of database 134 may comprise any suitable capacity policy describing the reorder point and target quantity, or other capacity policy parameters that set rules for connection pickup system 110 and/or planning and execution system 130 to manage capacity. Capacity policies 270 may be based on target service level, demand, cost, or the like. According to embodiments, capacity policies 270 comprise target service levels that ensure that a service level of one or more supply chain entities 140 is met with a set probability. For example, one or more supply chain entities 140 may set a service level at 95%, meaning one or more supply chain entities 140 sets the desired capacity level at a level that meets demand 95% of the time.

Inventory policies 272 of database 134 may comprise any suitable inventory policy describing the reorder point and target quantity, or other inventory policy parameters that set rules for connection pickup system 110 and/or planning and execution system 130 to manage and reorder inventory. Inventory policies 272 may be based on target service level, demand, cost, fill rate, or the like. According to embodiments, inventory policies 272 comprise target service levels that ensure that a service level of one or more supply chain entities 140 is met with a set probability. For example, one or more supply chain entities 140 may set a service level at 95%, meaning one or more supply chain entities 140 sets the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, connection pickup system 110 and/or planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s,S) inventory policy. Other inventory policies 272 may be used for perishable goods, such as fruit, vegetables, dairy, fresh meat, as well as electronics, fashion, and similar items for which demand drops significantly after a next generation of electronic devices or a new season of fashion is released.

Store data 274 may comprise data describing the stores of one or more retailers and related store information. Store data 274 may comprise, for example, a store ID, store description, store location details, store location climate, store type, store opening date, lifestyle, store area (expressed in, for example, square feet, square meters, or other suitable measurement), latitude, longitude, and other similar data.

Customer data 276 may comprise customer identity information, including, for example, customer relationship management data, loyalty programs, and mappings between product purchases and one or more customers so that a customer associated with a transaction may be identified. Customer data 276 may comprise data relating customer purchases to one or more products, geographical regions, store locations, or other types of dimensions. In embodiments, customer data 276 also comprises customer profile information including demographic information and preferences. As discussed in further detail below, customer data 276 may include purchase history data (e.g., which items a customer has previously bought from a retailer or patterns of visits to a supply chain site), profile data (e.g., items in saved wish-lists, items in saved carts, or items being bought by a shopper cluster that the customer belongs to), calendar data (e.g., any upcoming events or bookings), IoT data and browsing history data (e.g., a customer asking a digital assistant for the items with particular attributes), message data (e.g., a customer posting item requirements to customer-service and/or social-media), and the like. In embodiments, customer data 276 further comprises contact details for the customer, such as communication preferences and devices associated with the customer, and one or more contact methods, such as phone numbers, email addresses, or the like. Customer data 276 may also include data related to detecting the presence of the customer in the supply chain site, such as location data associated with a device of the customer, facial recognition data from one or more facial recognition sensors or cameras, or manual input by a worker of the supply chain site or by the customer indicating a presence of the customer at the supply chain site. According to embodiments, customer data 276 also comprises customer profile information, including demographic information and preferences.

Demand forecasts 278 of database 134 may indicate future expected demand based on, for example, any data relating to past sales, past demand, purchase data, promotions, events, or the like of one or more supply chain entities 140. Demand forecasts 278 may cover a time interval such as, for example, by the minute, hour, daily, weekly, monthly, quarterly, yearly, or any other suitable time interval, including substantially in real time. According to some embodiments, demand may be modeled as a negative binomial or Poisson-Gamma distribution. According to other embodiments, the model also takes into account shelf-life of perishable goods (which may range from days (e.g., fresh fish or meat) to weeks (e.g., butter) or even months, before any unsold items have to be written off as waste), as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. By way of example only and not by way of limitation, an exemplary supermarket may stock twenty thousand items at one thousand locations. When each location of this exemplary supermarket is open every day of the year, planning module 250 of planning and execution system 130 needs to calculate approximately $2 \times 10^{10}$ demand forecasts 278 each day to derive the optimal order volume for the next delivery cycle (e.g., three days).

Supply chain models 280 of database 134 comprise characteristics of a supply chain setup to deliver customer expectations of a particular customer business model. These characteristics may comprise differentiating factors, such as, for example, MTO (Make-to-Order), ETO (Engineer-to-Order), or MTS (Make-to-Stock). However, supply chain models 280 may also comprise characteristics that specify the supply chain structure in even more detail, including, for example, specifying the type of collaboration with the customer (e.g., Vendor-Managed Inventory (VMI)), from where products may be sourced, and how products may be allocated, shipped, or paid for by particular customers. Each of these characteristics may lead to a different supply chain model. Prediction models 282 comprise one or more of the trained models used by planning and execution system 130 for predicting, among other variables, pricing, targeting, or retail volume, such as, for example, a forecasted demand volume for one or more products at one or more stores of one or more retailers based on the prices of the one or more products.

Figure 3:
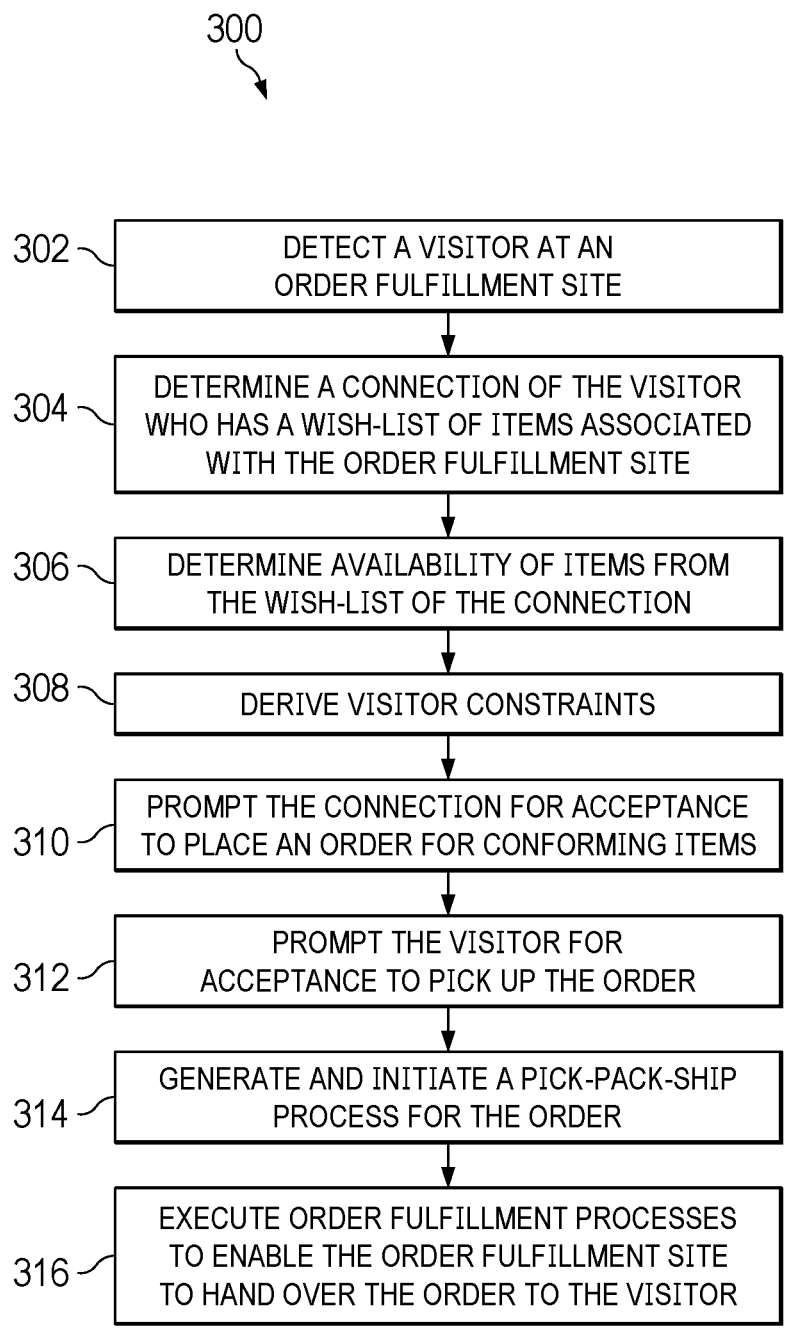
FIG. 3 illustrates a method for using a visitor to pick up orders for a connection at an order fulfillment site, in accordance with an embodiment.

FIG. 3 illustrates method 300 for using a visitor to pick up orders for a connection at an order fulfillment site, in accordance with an embodiment. Although method 300 is described in connection with the example of a retail store as the order fulfillment site, embodiments contemplate application of method 300 to any order fulfillment site. Method 300 may be performed by a connection pickup system, such as connection pickup system 110 of FIG. 1. Method 300 proceeds by one or more activities, which although described in a particular order, may be performed in one or more permutations, combinations, orders, or repetitions, according to particular needs.

At activity 302, detection module 202 of connection pickup system 110 detects a visitor at an order fulfillment site, such as a retail store. Detection module 202 may detect the visitor based on facial recognition of the visitor, location data of the visitor (e.g., mobile device location data or the like), manual input by the visitor (e.g., input from a device associated with the visitor or a kiosk or similar device within the order fulfillment site), or by manual input of a worker within the order fulfillment site. In addition, or as an alternative, detection module 202 may predict that the visitor will visit the order fulfillment site in the future based on various data of the visitor, such as appointment data indicating that the visitor has an appointment at the order fulfillment site at a future time, or historical data indicating that the visitor has an established pattern of visiting the order fulfillment site on certain days or at certain times.

At activity 304, connection module 204 of connection pickup system 110 determines a connection of the visitor who has a wish-list of items associated with the order fulfillment site. Connection module 204 may determine the connection based on various sources of visitor data 220 and data associated with possible connections, such as, for example, social media data and message data indicating relationships between the visitor and a possible connection, IoT data indicating that the visitor and a possible connection are frequently in the same location, calendar data indicating that the visitor and a possible connection have been invited to be participants of the same calendar event, or the like. Connection module 204 may also analyze profile data of the visitor to identify whether the visitor has manually entered information specifying one or more people as connections for pickup services and determine a specified person as the connection. In some embodiments, connection module 204 analyzes dissertation data of the visitor, such as, for example, when a GPS system of the visitor includes a route with a stop at the order fulfillment site, but a final destination of an address associated with a possible connection. In addition, or as an alternative, when the destination of the visitor is the home of the visitor, connection module 204 may determine the connection to be possible connection whose address is along the route to the home of the visitor, or are within a certain distance of the route, such as below a threshold of distance or time added to the exiting route.

At activity 306, inventory module 206 of connection pickup system 110 determines the availability of one or more items from the wish-list of the connection. In embodiments, inventory module 206 accesses real-time inventory data 268 of the order fulfillment site or within supply chain network 100 to determine whether one or more items from the wish-list are available for purchase at the order fulfillment site.

At activity 308, visitor constraints module 208 of connection pickup system 110 derives visitor constraints of the visitor that may impact the ability of the visitor to pick up the one or more available items. Visitor constraints module 208 may utilize various data streams to derive the visitor constraints, such as IoT data of a vehicle or other devices associated with the visitor that indicate vehicle size, range, or storage capacity, profile data of the visitor that specifies willingness or ability to pick up items, calendar data of the visitor that indicates time constraints immediately after the trip to the order fulfillment site or other time constraints, or manual input of the visitor that specifies a willingness or ability to perform pickup operations. Based on the derived visitor constraints, visitor constraints module 208 determines which of the one or more available items conform to the visitor constraints.

At activity 310, user interface module 210 of connection pickup system 110 prompts the connection for acceptance to place an order for at least one of the one or more conforming items using the visitor as a pickup resource. At activity 312, user interface module 210 prompts the visitor for acceptance to pick up the order for the connection. In some embodiments, user interface module 210 prompts the visitor to pick up the order for the connection to purchase. In other embodiments, user interface module 210 prompts the visitor to purchase the order for the connection. In still other embodiments, user interface module 210 offers a purchase option to the visitor without the input of the connection, such as for a gift or surprise for the connection from the visitor.

At activity 314, pickup execution module 212 of connection pickup system 110 generates and initiates a pick-pack-ship process for the order. According to embodiments, pickup execution module 212 generates the pick-pack-ship process to adhere to the visitor constraints derived at activity 308. In embodiments where user interface module 210 offers the purchase option to the visitor without the input of the connection, pickup execution module 212 places the order on behalf of the connection so that the pick-pack-ship process may be executed for the order without requiring input from the connection. In some embodiments, pickup execution module 212 generates and automatically implements an order fulfillment plan to prepare the order for pickup, such as, for example, transferring one or more conforming items of the order from another location in supply chain network 100 to the order fulfillment site, or moving one or more conforming items of the order from a backroom of the order fulfillment site to an order pickup area within or associated with the order fulfillment site.

At activity 316, pickup execution module 212 executes order fulfillment processes to enable the order fulfillment site to hand over the order to the visitor during the visit to the order fulfillment site, such as at the time of checkout or upon exiting the order fulfillment site. For example, pickup execution module 212 may add the order to a pre-existing pickup order that the visitor has placed and have the combined order placed at the front of the store to be given to the visitor upon checkout, or have the combined order placed in an order pickup area of the order fulfillment site to be picked up by the visitor. According to embodiments, the order is fulfilled upon purchase of the order, upon pickup of the order, upon the visitor bringing the order to the connection, or the like.

To further illustrate the operation of method 300, the following non-limiting example is provided. In this example, Customer A lives with his mother, Customer B. While browsing a website for Retailer C, Customer B adds a book to her shopping cart but does not purchase the item. Later, Customer A arrives at a physical store of Retailer C (order fulfillment site), and detection module 202 detects Customer A to be a visitor at the physical store of Retailer C at activity 302. At activity 304, connection module 204 determines that since Customer A lives with Customer B, and that Customer B may be interested in the book in her online shopping cart, Customer B is a connection of Customer A who has a wish-list associated with the physical store of Retailer C. At activity 306, inventory module 206 determines that the book is available at the physical store of Retailer C, and visitor constraints module 208 derives visitor constraints of Customer A and determines that picking up the book conforms to all of the derived visitor constraints at activity 308. At activity 310, user interface module 210 prompts Customer B for acceptance to place an order for the book and have Customer A pick up the book for Customer B while Customer A is at the physical store of Retailer C. Customer B accepts, and user interface module 210 prompts Customer A for acceptance to pick up the book for Customer B at activity 312. Upon acceptance from Customer A, pickup execution module 212 generates a pick-pack-ship process for the book that includes Customer B picking up the book from a designated pickup area in the physical store of Retailer C at activity 314. Pickup execution module 212 initiates the pick-pack-ship process by placing an order for the book on behalf of Customer B. At activity 316, pickup execution module 212 executes the generated pick-pack-ship process, enabling Customer A to pick up the book from the designated pickup area and deliver the book to Customer B.

As a further example, Customers D and E are good friends and Customer E has a wedding in the near future, to which Customer D is invited. Customer E has a wedding register (wish-list) with Retailer C. Customer D goes to the physical store of Retailer C (order fulfillment site), and detection module 202 detects his arrival at activity 302. At activity 304, connection module 204 determines, based on calendar data associated with Customer D, that Customer D is attending the wedding of Customer E, and that Customer E is therefore a connection of Customer D. At activity 306, inventory module 206 determines that a small appliance that is listed on the wedding registry is available at the physical store of Retailer C. Based on IoT data of Customer D, visitor constraints module 208 determines that Customer D has enough space in his trunk of his car for the appliance that is listed on the wedding registry and available at the physical store of Retailer C at activity 308. At activity 312, user interface module 210 suggests, via a smartphone associated with Customer D, that Customer D purchase the appliance for Customer E and prompts Customer D for acceptance to purchase the appliance. Customer D accepts the suggestion, and pickup execution module 212 generates and initiates a pick-pack-ship process of gift wrapping the appliance and placing the appliance at the front of the store to be given to Customer D upon checkout at activity 314. At activity 316, pickup execution module 212 executes the pick-pack-ship process, and Customer D obtains and purchases the appliance at checkout. Thus, as compared to existing retail systems, when using the systems and methods disclosed herein, Retailer C makes a sale of an appliance that otherwise would not have occurred.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for using a visitor to pick up orders for a connection at an order fulfillment site, comprising:

a computer, comprising a processor and a memory, the computer configured to:
  detect a visitor at an order fulfillment site based on facial recognition of the visitor using video feeds of cameras;
  determine a connection of the visitor, wherein the connection has a wish-list of items associated with the order fulfillment site;
  determine a real-time inventory availability of one or more items from the wish-list of the connection;
  derive one or more visitor constraints of the visitor that may impact an ability of the visitor to pick up the one or more available items based, at least in part, on IoT data of a vehicle that indicate vehicle size, range, or storage capacity;
  prompt, using a device, the connection for acceptance to place an order for at least one of the one or more items using the visitor as a pickup resource, wherein the at least one of the one or more items conforms to the derived one or more visitor constraints;
  generate and initiate a pick-pack-ship process for the order; and
  execute one or more order fulfillment processes to enable the order fulfillment site to hand over the order to the visitor.

2. The system of claim 1, wherein the computer is further configured to:
  determine the connection based on one or more sources of visitor data and data associated with possible connections, comprising one or more of:
    social media data and message data indicating one or more relationships between the visitor and a possible connection, IoT data indicating that the visitor and a possible connection have been in a same location, and calendar data indicating that the visitor and a possible connection have been invited to be participants of a same calendar event.

3. The system of claim 1, wherein the computer is further configured to:
  further derive the one or more visitor constraints based on one or more data streams comprising one or more of:
    profile data of the visitor that specifies a willingness or an ability to pick up items;
    calendar data of the visitor that indicates time constraints immediately after a trip to the order fulfillment site or other time constraints; and
    manual input of the visitor that specifies a willingness or ability to perform pickup operations.

4. The system of claim 1, wherein the pick-pack-ship process adheres to the derived one or more visitor constraints.

5. The system of claim 1, wherein the computer is further configured to:
  add the order to a pre-existing pickup order to combine the order and the pre-existing pickup order.

6. The system of claim 1, wherein the computer is further configured to:
  determine the availability of the one or more items by accessing real-time inventory data of the order fulfillment site.

7. A computer-implemented method for using a visitor to pick up orders for a connection at an order fulfillment site, comprising:
  detecting, by a computer comprising a processor and a memory, a visitor at an order fulfillment site based on facial recognition of the visitor using video feeds of cameras;
  determining, by the computer, a connection of the visitor, wherein the connection has a wish-list of items associated with the order fulfillment site;
  determining, by the computer, a real-time inventory availability of one or more items from the wish-list of the connection;
  deriving, by the computer, one or more visitor constraints of the visitor that may impact an ability of the visitor to pick up the one or more available items based, at least in part, on IoT data of a vehicle that indicate vehicle size, range, or storage capacity;
  prompting, by the computer using a device, the connection for acceptance to place an order for at least one of the one or more items using the visitor as a pickup resource, wherein the at least one of the one or more items conforms to the derived one or more visitor constraints;
  generating and initiating, by the computer, a pick-pack-ship process for the order; and
  executing, by the computer, one or more order fulfillment processes to enable the order fulfillment site to hand over the order to the visitor.

8. The computer-implemented method of claim 7, further comprising:
  determining, by the computer, the connection based on one or more sources of visitor data and data associated with possible connections, comprising one or more of:
    social media data and message data indicating one or more relationships between the visitor and a possible connection, IoT data indicating that the visitor and a possible connection have been in a same location, and calendar data indicating that the visitor and a possible connection have been invited to be participants of a same calendar event.

9. The computer-implemented method of claim 7, further comprising:
  further deriving, by the computer, the one or more visitor constraints based on one or more data streams comprising one or more of:
    profile data of the visitor that specifies a willingness or an ability to pick up items;
    calendar data of the visitor that indicates time constraints immediately after a trip to the order fulfillment site or other time constraints; and
    manual input of the visitor that specifies a willingness or ability to perform pickup operations.

10. The computer-implemented method of claim 7, wherein the pick-pack-ship process adheres to the derived one or more visitor constraints.

11. The computer-implemented method of claim 7, further comprising:
  adding, by the computer, the order to a pre-existing pickup order to combine the order and the pre-existing pickup order.

12. The computer-implemented method of claim 7, further comprising:
  determining, by the computer, the availability of the one or more items by accessing real-time inventory data of the order fulfillment site.

13. A non-transitory computer-readable medium embodied with software for using a visitor to pick up orders for a connection at an order fulfillment site, the software when executed is configured to:
  detect, by a computer comprising a processor and a memory, a visitor at an order fulfillment site based on facial recognition of the visitor using video feeds of cameras;

determine a connection of the visitor, wherein the connection has a wish-list of items associated with the order fulfillment site;

determine a real-time inventory availability of one or more items from the wish-list of the connection;

derive one or more visitor constraints of the visitor that may impact an ability of the visitor to pick up the one or more available items based, at least in part, on IoT data of a vehicle that indicate vehicle size, range, or storage capacity;

prompt, using a device, the connection for acceptance to place an order for at least one of the one or more items using the visitor as a pickup resource, wherein the at least one of the one or more items conforms to the derived one or more visitor constraints;

generate and initiate a pick-pack-ship process for the order; and execute one or more order fulfillment processes to enable the order fulfillment site to hand over the order to the visitor.

14. The non-transitory computer-readable medium of claim 13, wherein the software when executed is further configured to:

determine the connection based on one or more sources of visitor data and data associated with possible connections, comprising one or more of:

social media data and message data indicating one or more relationships between the visitor and a possible connection, IoT data indicating that the visitor and a possible connection have been in a same location, and calendar data indicating that the visitor and a possible connection have been invited to be participants of a same calendar event.

15. The non-transitory computer-readable medium of claim 13, wherein the computer is further configured to:

further derive the one or more visitor constraints based on one or more data streams comprising one or more of:

profile data of the visitor that specifies a willingness or an ability to pick up items;

calendar data of the visitor that indicates time constraints immediately after a trip to the order fulfillment site or other time constraints; and manual input of the visitor that specifies a willingness or ability to perform pickup operations.

16. The non-transitory computer-readable medium of claim 13, wherein the pick-pack-ship process adheres to the derived one or more visitor constraints.

17. The non-transitory computer-readable medium of claim 13, wherein the computer is further configured to:

determine the availability of the one or more items by accessing real-time inventory data of the order fulfillment site; and add the order to a pre-existing pickup order to combine the order and the pre-existing pickup order.

* * * * *